A. K. ZAWADZKI.
METHOD OF AND APPARATUS FOR MAKING WEBBED GLOVES.
APPLICATION FILED OCT. 26, 1920.
1,389,283.
Patented Aug. 30, 1921.
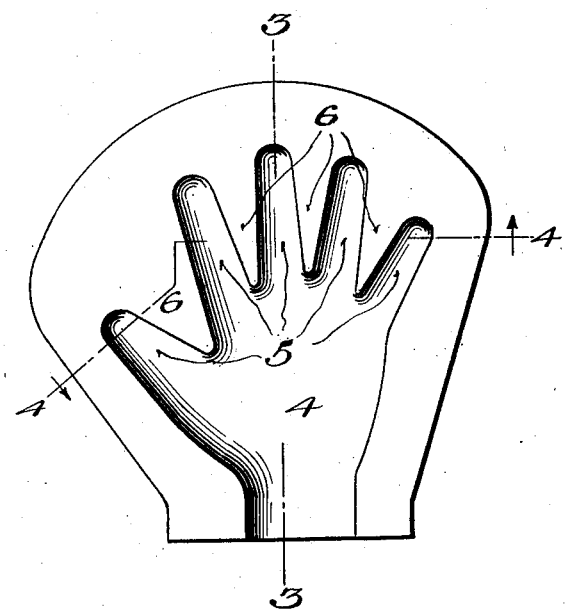
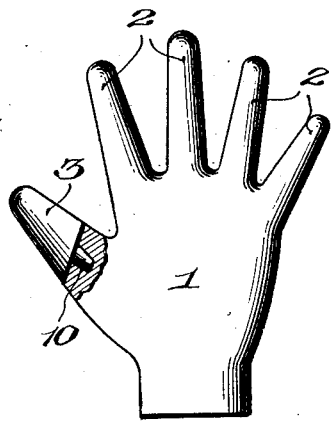
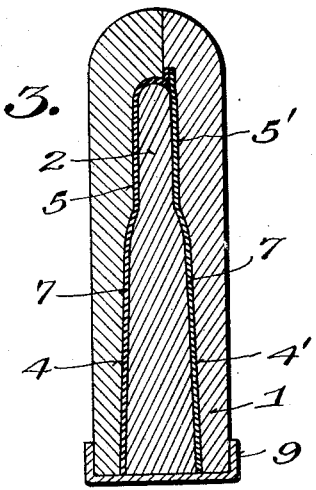
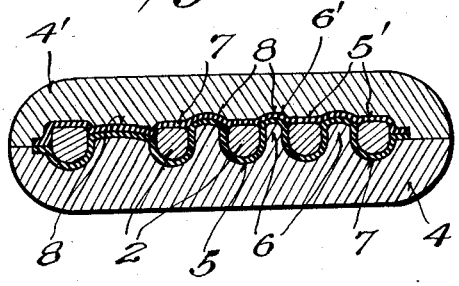
Witness
Inventor
Anthony K. Zawadzki
By Strong & Townsend
Attorneys

UNITED STATES PATENT OFFICE.

ANTHONY K. ZAWADZKI, OF WRIGHTSTOWN, NEW JERSEY.

METHOD OF AND APPARATUS FOR MAKING WEBBED GLOVES.

1,389,283. Specification of Letters Patent. Patented Aug. 30, 1921.

Application filed October 26, 1920. Serial No. 419,614.

*To all whom it may concern:*

Be it known that I, ANTHONY K. ZAWADZKI, a citizen of the United States, residing at Wrightstown, in the county of Burlington and State of New Jersey, have invented certain new and useful Improvements in Methods of and Apparatus for Making Webbed Gloves, of which the following is a specification.

This invention relates to a new and useful method of making and mold for webbed gloves, and especially the rubber swimming glove, described and claimed in Patent No. 1221950, granted to me April 10, 1917.

The principal object of this invention resides in the formation of a mold on which webbed rubber gloves that are unitary throughout, are made, and it consists in placing two sheets of uncured rubber on opposite sides of a hand-shaped core; inclosing the same by a mold conformable thereto, and subjecting the whole mass to a vulcanizing heat whereby the previously two-ply webs between the fingers and thumb will melt into single, unitary and integral webs.

In the drawing:

Figure 1, is an inside view of one section of the mold employed in the invention;

Fig. 2, is an elevation, partly in section, of the hand shaped core;

Fig. 3, is a longitudinal section through the complete mold, taken on line 3—3 of Fig. 1; and Fig. 4, is a transverse section thereof on line 4—4 of Fig. 1.

In carrying out the invention I prefer to use a mold embodying, in its simplest form, a core 1 of hand-shape, having the fingers 2 and thumb 3, and a shell consisting of separable sections 4 and 4', the latter having depressions conformably and entirely receiving the core, so that no portions of the core extend above the active faces of said section. The finger and thumb cavities 5, of the section 4, have the interposed web-forming raised portions 6, which extend slightly above or are substantially flush with the outer face of the core. The shell sections 4', have slightly raised portions 5', opposing the cavities 5, and shallow depressions 6' opposing the portions 6.

The formation of a glove in accordance with this invention involves first, laying a sheet of rubber which is uncured across the active or recessed face of shell section 4; then placing the core 1, on top of this sheet, which depresses the sheet into the cavities 5, of the shell section; spreading a second sheet of uncured rubber over the previously positioned core; and subsequently applying the component shell section 4', which conforms the second rubber sheet to the outer face of the core, and brings the second sheet into firm contact with the portions intermediate the fingers and thumb of the first sheet of rubber, thereby forming two-ply webs 8 arranged tangential or at the upper side of the fingers. A cap 9, or other suitable closure, for the end of the mold is then applied to protect the rubber from direct contact with the heat.

The mold is now subjected to a vulcanizing heat which melts the two-ply webs into a single, integral thickness forming integral connections between the fingers and thumb. After vulcanization has been completed, the mold is opened and the glove is removed from over the core. To facilitate this removal from the core the latter has its thumb detachably connected at its base as by a pin and socket connection 10. By thus removing the thumb, the width of the core is materially lessened, so that the glove does not have to be stretched to any material extent. The finished molded article is integral throughout, having its fingers and thumb integrally joined by one-ply webs. Thus, the structure is materially strengthened and made more durable and serviceable.

The glove is economically formed simply by placing a sheet of rubber in the mold, placing the core thereon, and then placing a second sheet of rubber thereover and closing the mold for vulcanization.

The glove can also be formed by pouring a rubber solution into the mold when it will flow around the inside and core to form an integral article upon vulcanizing it by any suitable process.

What is claimed is—

1. The method of making webbed rubber gloves, consisting in placing a sheet of uncured rubber on each side of a hand-shaped core and with the parts of the sheets between the fingers and thumb in contacting relation to form permanent continuous webs extending across the space between adjacent fingers, conforming the sheets to the core by inclosing the same in a conformable shell, and subjecting the whole to a vulcanizing heat.

2. The method of making webbed rubber gloves, consisting in conforming two uncut sheets of uncured rubber to an interposed hand-shaped core and with the parts of the sheets between the fingers and thumb in contacting relation to form permanent continuous webs extending across the space between adjacent fingers, and vulcanizing the sheets in their core-conforming relation to integrally unite the sheets between the fingers and thumb.

3. The method of making webbed rubber gloves, consisting in placing a cut out sheet of uncured rubber on opposite sides of a core, conforming the sheets thereto by applying a conformable inclosing shell whereby the two sheets will be brought into intimate contact with each other between the fingers and thumb, and subjecting the whole to heat for uniting the contacting portions of the sheets into integral web-forming portions which are permanent and continuous and extend across the spaces between adjacent fingers.

4. A mold for making webbed gloves comprising a hand-shaped core having a removable thumb, and a sectional shell inclosing the core, one shell section having a core-receiving cavity of sufficient depth to entirely receive the core.

5. The method of making webbed gloves, which consists in applying uncured rubber to a hand-shaped core so as to completely inclose each finger and the thumb of the core and to extend throughout the space between each of adjacent fingers and between the thumb and forefinger to form continuous connecting webs integral with and permanently extending across the space between adjacent fingers, and finally in vulcanizing the rubber.

In testimony whereof I affix my signature.

ANTHONY K. ZAWADZKI.